United States Patent [19]
Kurita et al.

[11] Patent Number: 4,984,184
[45] Date of Patent: Jan. 8, 1991

[54] CONTROLLING DEVICE FOR ELECTRIC APPARATUS

[75] Inventors: Hitoshi Kurita, Yamato koriyama; Hiroyuki Senda, Nara; Hiroshi Terasaki, Ikoma, all of Japan

[73] Assignee: Matsushita Electric Industrial Co., Ltd., Osaka, Japan

[21] Appl. No.: 525,222

[22] Filed: May 17, 1990

Related U.S. Application Data

[63] Continuation of Ser. No. 215,803, Jul. 6, 1988, abandoned.

[30] Foreign Application Priority Data

Jul. 6, 1987 [JP] Japan ................... 62-168058
Apr. 28, 1988 [JP] Japan ................... 63-106438

[51] Int. Cl.⁵ .................. G06F 15/20; G05B 11/01
[52] U.S. Cl. .................. 364/551.01; 364/557; 364/152; 99/DIG. 10; 99/332; 374/141; 374/149; 318/471
[58] Field of Search ............ 364/550, 551.01, 557, 364/146, 147; 377/25; 361/24; 374/141, 149; 318/471; 99/DIG. 10, 331, 332, 333

[56] References Cited

U.S. PATENT DOCUMENTS

| 4,409,662 | 10/1983 | Rao | 364/557 |
| 4,561,741 | 12/1985 | Ishizaka et al. | 354/21 |
| 4,573,132 | 2/1986 | Boothman et al. | 364/557 |
| 4,600,962 | 7/1986 | Bliehall | 361/77 |
| 4,601,004 | 7/1986 | Holt et al. | 364/557 |
| 4,636,949 | 1/1987 | Longabaugh | 364/557 |
| 4,742,455 | 5/1988 | Schreyer | 364/557 |
| 4,796,207 | 1/1989 | Andre et al. | 364/557 |

FOREIGN PATENT DOCUMENTS 60-181517  9/1985  Japan .
WO85/03995  9/1985  PCT Int'l Appl. .
WO87/04797  8/1987  PCT Int'l Appl. .

*Primary Examiner*—Parshotam S. Lall
*Assistant Examiner*—Brian M. Mattson
*Attorney, Agent, or Firm*—Wenderoth, Lind & Ponack

[57] ABSTRACT

A safety device for a heating apparatus detects the errors of the input power-supply voltage, failures of the respective heating device and control device, and displays the detected failure and safety stops the associated apparatus. The safety device quickly and safely stops only a faulty heating function if the heating apparatus further has a plurality of heating functions, and allows the other normal heating functions of the heating apparatus to be used.

5 Claims, 6 Drawing Sheets

CONTROLLING DEVICE FOR ELECTRIC APPARATUS

This application is a continuation of now abandoned application, Ser. No. 07/215,803 filed on July 6, 1988.

BACKGROUND OF THE INVENTION

1. Field of the Invention

The present invention relates to a safety means for a heating apparatus for use with electric appliances such as an electric oven or an electronic range each having a digital control portion or for compound ovens and so on, and for use with apparatus such as washing machines or coolers. The safety means detects the errors of the input power-supply voltage, the failures of the respective heating means and control means, and displays the detected failure and safely stop the associated electric appliances.

In terms of heating apparatuses, single function electronic ranges, single function electric ovens, commodities intended for higher outputs by two high-frequency generating apparatuses mounted therein, compound devices having both the heater heating and high-frequency heating to realize alternate or simultaneous heating have been offered for sale, a high-frequency heating apparatus with two high-frequency heating apparatuses being mounted therein requires a high-tension transformer, a high-tension capacitor, a magnetron and a high-tension diode, and a relay apparatus, such as a relay and so on for controlling them. The frequency of failures of the functional components increases with the increase in the number of components. The failures of the functional components may cause an abnormal current flow which may cause an extremely danger condition.

Also, more time is needed to locate which component is out of order so as to repair it, because the number of components has increased.

Many input voltages are provided because of internationalization of the devices. For example, since both 208 V and 230 V may be disposed in the same outlet style in North America, the incorrect connection of the apparatuses may often be made. For example, when the tap of the primary side of the low-tension transformer and the high-tension transformer of the high-frequency heating apparatus having a digital control portion, which is set in 208 V, is connected to a power supply of 230 V, the voltage which is higher by approximately 10% (230 V/208 V $\approx$ 1.1) than normal is outputted onto the secondary side, with the inconvenience that the service life of the apparatuses such as the magnetron of a high-frequency generating apparatus becomes considerably shorter. When the tap on the primary side of the apparatus is set at 230 V, the high-frequency output becomes smaller than normal when the power-supply of 208 V is connected with the inconvenience that the cooking time becomes longer.

In the heater heating operation of a sheathed heater and so on, the heating output varies by approximately 20% with change in the 10% input voltage, with the inconveniences that the heating becomes excessive ($PO = V_{IN}2/R$) or the temperature does not reach its set value. These incorrect connections are often found for the first time when the cooking performance has been inferior after long usage, because the incorrect connections are hard to detect.

SUMMARY OF THE INVENTION

The present invention has been developed with a view to substantially solving the above described disadvantages and has for its essential object to provide an electric appliance apparatus which displays the failures or abnormal contents of heating apparatus for electric ovens and electronic ranges each having a digital control portion or for these composite ovens, the failures of heaters, motors, compressors, high-tension transformers, high-tension capacitors, diodes and magnetrons which are components for a washing machine, for example, the failures of the relays for controlling and stops the electric appliance quickly and safely.

Another important object of the present invention is to provide an electronic appliance apparatus which quickly and safely stops only a faulty heating function if it further has a plurality of heating functions with the other normal functions of the electric apparatus capable of being used as is.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DETAILED DESCRIPTION OF THE PREFERRED EMBODIMENTS

Before the description of the present invention proceeds, it is to be noted that like parts are designated by like reference numerals throughout the accompanying drawings.

Figure 1:
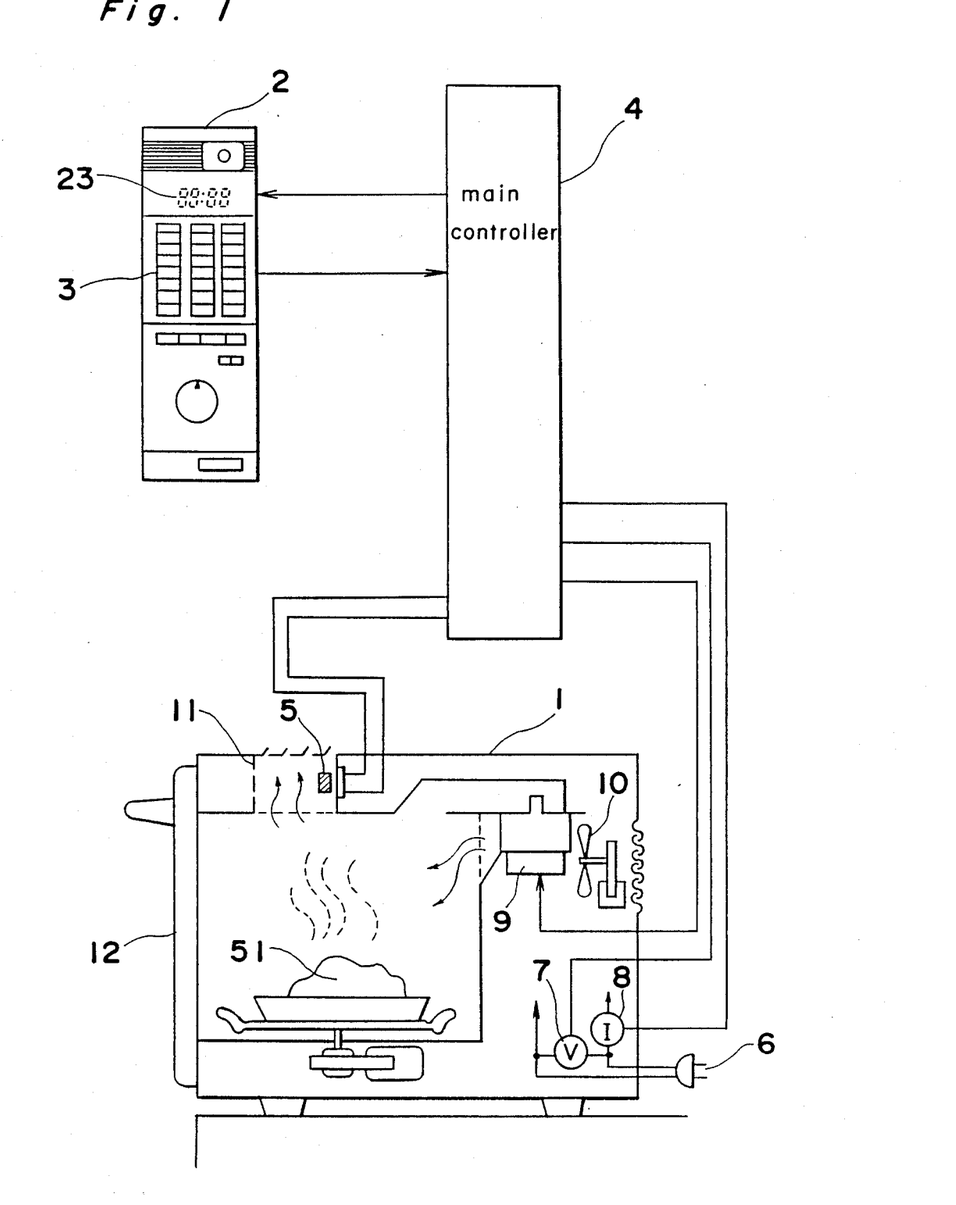
FIG. 1 is a block diagram of a heating apparatus showing a first embodiment of the present invention.

Referring now to the drawings, there is shown in FIG. 1, a heating apparatus according to one preferred embodiment of the present invention. A keyboard 3, which is an input means, is arranged on an operation panel 2 of a high-frequency heating apparatus 1 so that users may enter various commands to a controlling system. Also, fluorescent display tubes 23 are provided as a display means for displaying the operation contents and cooking contents. A main control portion 4, used as the controlling means, intermittently controls the heating operation of a magnetron 9, which is a high-frequency generating apparatus, in accordance with the input information from the keyboard 3, and from a temperature sensor 5 which is a temperature detecting means mounted on an exhaust guide 11, and from a voltage detecting means 7 for detecting the voltage of a power supply 6, and from a current detecting means 8 for detecting the load current of the heating apparatus.

A fan motor 10 cools the magnetron 9 to force cooling air into a heating chamber and so as to discharge the compartment heat, steam and so on from an exhaust guide 11.

A door 12 is provided in the front-face opening portion of the high-frequency heating apparatus 1.

Figure 2:
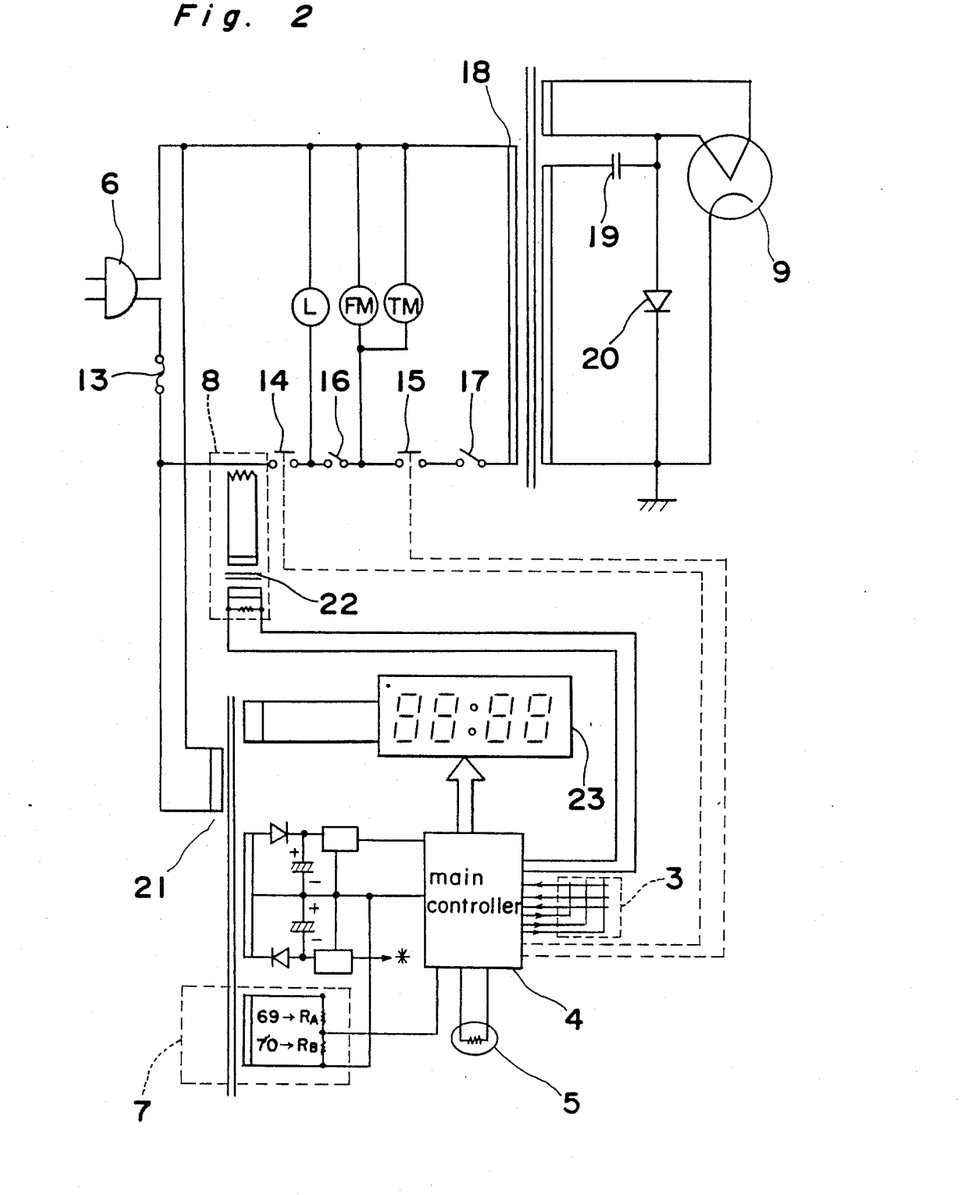
FIG. 2 is a circuit diagram of the apparatus of FIG. 1.

FIG. 2 is a circuit diagram of the apparatus of FIG. 1.

Power fed from an AC primary power-supply 6 is fed into a first intermittent relay 14 and a second intermittent relay 15, which are intermittent means, and through a fuse 13, into a first door switch 16 which is turned on and off through the opening and closing of the door 12 of the high-frequency heating apparatus 1, and into a high-tension transformer 18 through a second door switch 17.

The AC power is boosted to approximately 2,000 V by the high-tension transformer 18 and is rectified in a voltage doubler by a high-tension capacitor 19 and a high-tension diode 20 so as to operate the magnetron 9. Also, the power 6 is fed into a low-tension transformer 21 which outputs the low voltage so as to feed the power of the low voltage to the main controller 4 and so on. A voltage detecting means 7 outputs a voltage proportional to $R_B/R_A+R_B$ at the split between a resistor $R_A$ 69 and a resistor $R_B$ 70 of the secondary low voltage of the low-tension transformer 2 instead of the direct measurement of the AC primary voltage, to input the information thereof into the main controller 4. A current transformer 22, used as a current detecting means 8, is used to input into the main controller 4 a voltage value to be output onto the secondary side of the current transformer by the load current on the AC primary side. The temperature sensor 5 inputs into the main controller 4, likewise, variation in the resistance value caused by the temperature. Also, the information from the keyboard 3 is input into the main controller 4.

The outputs from the main controller 4 are the display outputs fed to the fluorescent display tube 23, and intermittent control output signals fed to the first intermittent relay 14 and to the second intermittent relay 15.

Figure 3:
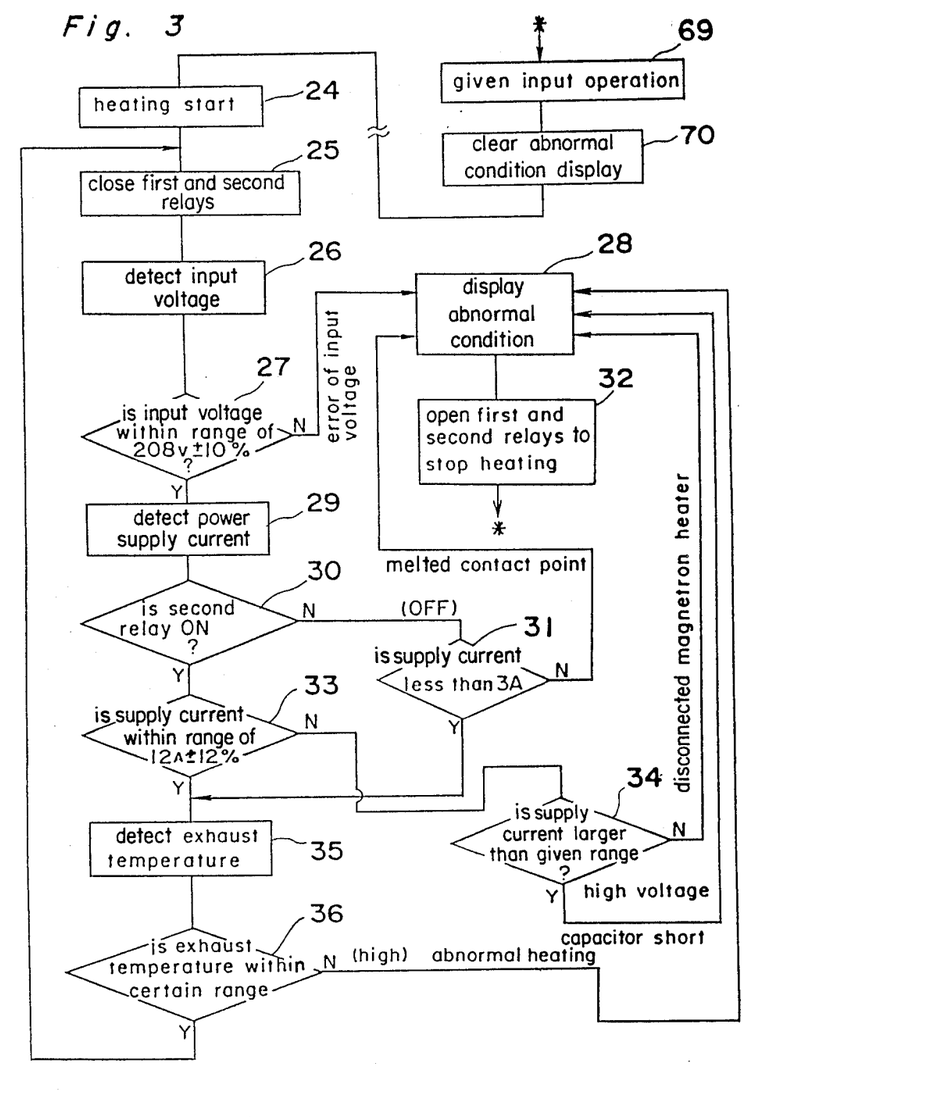
FIG. 3 is a flow chart of a failure examination of a major control portion of the apparatus of FIG. 1.

A controlling method at the main controller 4 in accordance with the input information will be described with reference to the flowchart of FIG. 3.

A heating method and a heating time are selected by a keyboard 3 to start the heating operation (step 24) so as to start the intermittent control of the relay. Both the first intermittent relay and the second intermittent relay are turned on (closed) (step 25). An input voltage is detected (step 26) by voltage detecting means 7. A voltage value is compared with a predetermined value by a comparing means to determine whether or not the voltage value is within the range of 208 V+10% of a rated input voltage (step 27). When the voltage value is out of rated input voltage ±10%, the abnormality is considered to be an input voltage error by an abnormality judging means so as to display the contents on the fluorescent display tube 23 used as the display means (step 28) and simultaneously the intermittent relay is opened to suspend the heating operation (step 32).

Then, the power-supply current is detected by current detecting means 8 (step 29). At this time, a determination is made as to whether or not the second intermittent relay 15 is on (step 30).

When the current value is larger than normally considered current value, namely, 3A or more (step 31) with the second intermittent relay 15 being off, the abnormality is considered to be a melted contact, so that the abnormal condition is displayed (step 28) by the fluorescent display tube 23 and both the first intermittent relay 14 and the second intermittent relay 15 are opened (step 32).

The abnormal display by the fluorescent display tubes 23 is provided through the combination of letters and numerals. The comparisons between the reference numerals and the abnormal conditions are noted in service manuals so that the failure conditions and the failure locations may be easily understood.

Also, a comparing operation is effected as to whether the current value is larger or smaller than 12±10% with the second intermittent relay 15 being ON (step 33). If the current value is larger than the given range, the cause for it is considered to be a heater disconnection of the magnetron 9 (step 34). If the current is smaller than the given range, the cause for it is considered to be a short in the high-tension capacitor 19 (step 34). These abnormal conditions are displayed by the fluorescent display tubes 23 (step 28) and the first intermittent relay 14 and second intermittent relay 15 are opened (step 32). An exhaust temperature is detected by the temperature sensor 5 mounted on the exhaust guide 11 (step 35) and the exhaust temperature is compared with a given temperature (step 36). If the temperature is higher than a given temperature, it is considered to be an abnormal heating condition, and is displayed (step 28) on the fluorescent display tube 23 and the first intermittent relay 14 and the second intermittent relay 15 are opened (step 32). Things are judged to be abnormal, and the abnormal display is effected to stop the heating operation as described hereinabove, and thereafter the given operation that the keyboard 3 is operated, the power supply of the heating apparatus is first disconnected and again connected is effected (step 69) so as to clear the abnormal condition display (step 70), so that the heating operation is effected again.

It is to be noted that the abnormal heating function shows the abnormal contents to come to a stop again with the other normal functions being able to be used as is.

A high-frequency heating apparatus having a plurality of magnetrons will be described hereinafter as a second embodiment. In order to increase the high-frequency output, in FIG. 4 and FIG. 5, the magnetrons 9 and 9' are respectively provided on two waveguides 38 and 38' with the same specification being disposed in the upper portion and the lower portion of the heating chamber 37.

Figure 4:
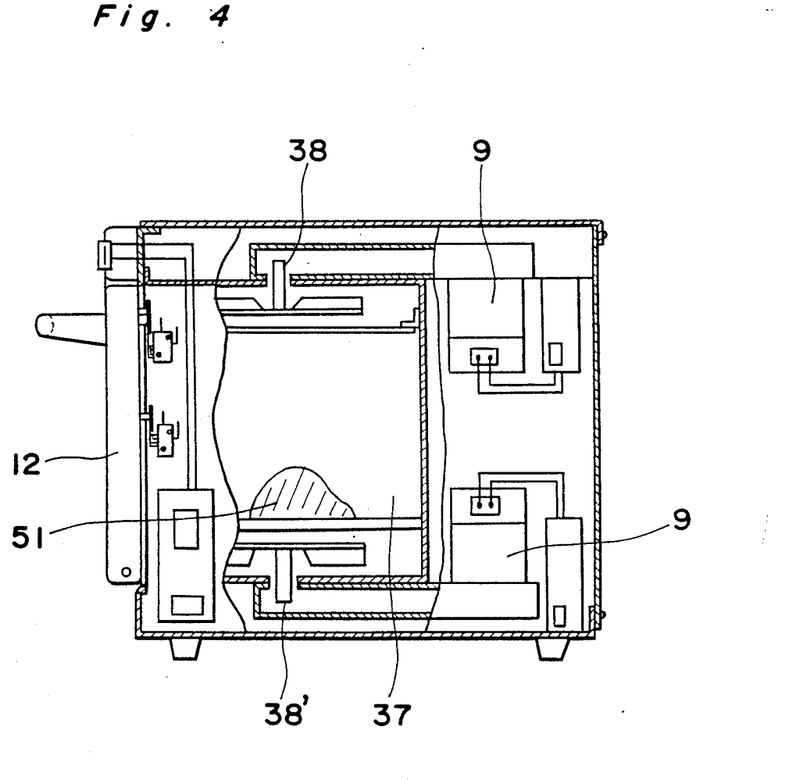
FIG. 4 is a sectional view of the major body of a heating apparatus having a plurality of heating means in accordance with a second embodiment of the present invention.
Figure 5:
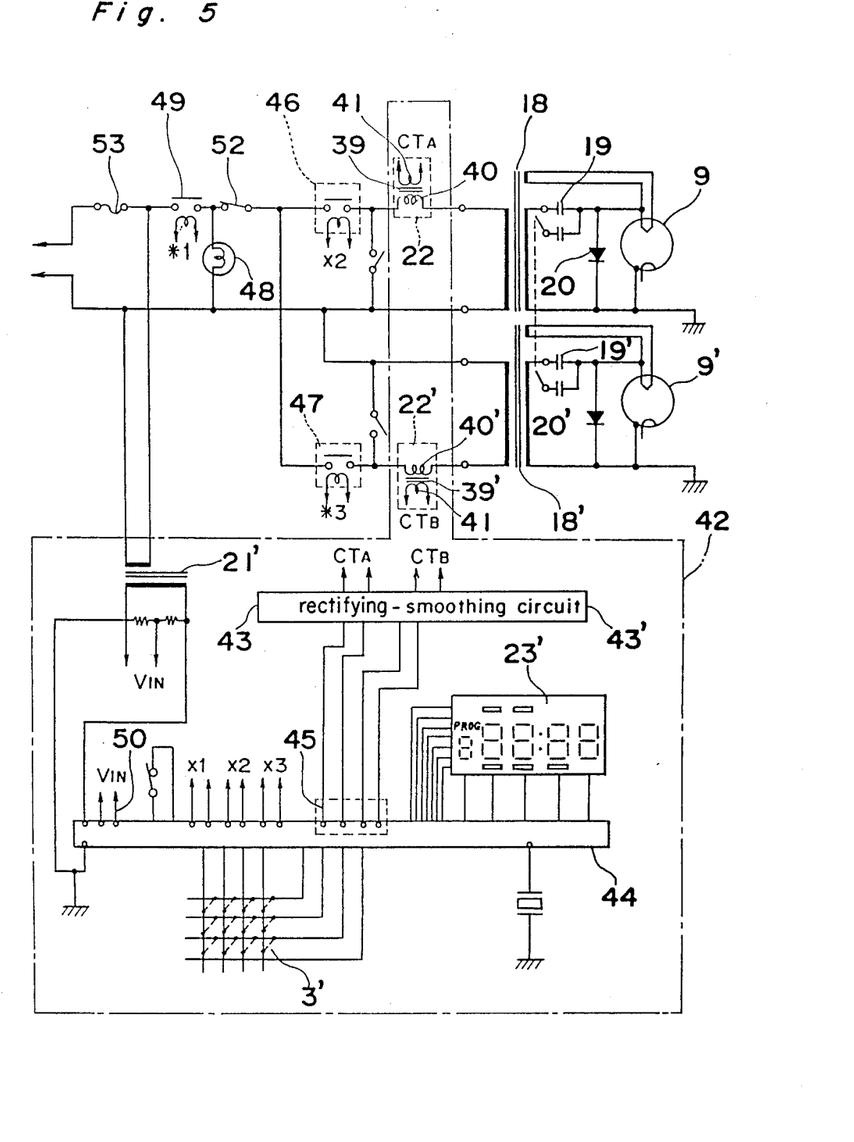
FIG. 5 is a circuit diagram of the apparatus of FIG. 4.

The power converted into necessary voltages is fed to the magnetrons 9 and 9' respectively from the power-supply voltage by a high-tension circuit composed of two high-tension transformers 18 and 18' of the same specification, and high-tension capacitors 19 and 19', and two high-tension diodes 20 and 20'.

Current transformers 22 and 22' are provided as a current detection means 8 on the AC primary side of the power supply.

The current transformers 22 and 22' are magnetically coupled to each other, with coils 40 and 40' wound on iron cores 39 and 39', and coils 41 and 41' insulated therefrom and wound likewise on the iron cores coils 39 and 39'.

The current transformers 22 and 22', together with the other electronic components, are mounted on a printed circuit board 42 constituting a control portion for controlling the main body. When the high-frequency heating apparatus is operating, current flows to the coils 40 and 40', likewise even to the coils 41 and 41' to excite the respective iron cores 39 and 39'. The magnetic flux causes a voltage in the coils 41 and 41' corresponding to the current on the primary side. The voltages caused in coils 41 and 41' are connected to rectifying-smoothing circuits 43 and 43' to convert them into DC. The number of the respective coils, the size of the iron cores, the capacitance of the rectification circuit, and the value of the resistors therein are set so that the output voltage converted into this direct current may be proportional to the current value flowing on the AC primary side. In the embodiment, the output voltage is 4 V when the current flowing into coils 40 and 40' is 10 A, and is $\approx 0.4$ V when the current is 1 A. The outputs of the rectification smoothing circuits 43 and 43' are connected to the input 45 of a microcomputer circuit 44 which is a main control portion.

The microcomputer circuit 44 is connected to a keyboard 3' for controlling the high-frequency heating apparatus main body, a fluorescent display tube 23' which is a display means for showing the operating condition, and a third intermittent relay 46 for interrupting the high-frequency heating operation, a fourth intermittent relay 47 and a lamp relay 49 to be used for interruption and so on of the illumination lamp 48 within the heating chamber to control the operation of the main body in accordance with a procedure programmed in advance. The microcomputer circuit 44 is operated by power provided through the drop of the power-supply voltage into the voltage necessary for the operation by a low-tension transformer 21', and through the conversion thereof into the direct current.

Also, a voltage input 50 for taking in one portion of the output voltage on the secondary side of the low-tension transformer 21' is provided on the microcomputer circuit 44 so as to observe the voltage of the AC primary side. The main body has a door 12 provided on the front face of the heating chamber 37 of the outlet place for food 51, a third door switch 52 having a contact for opening and closing operations in accordance with the opening and closing of the door 12 to interrupt the input into the high-tension transformers 18 and 18', a fuse 53 which opens when an excessive current flows in the AC primary side.

Figure 6:
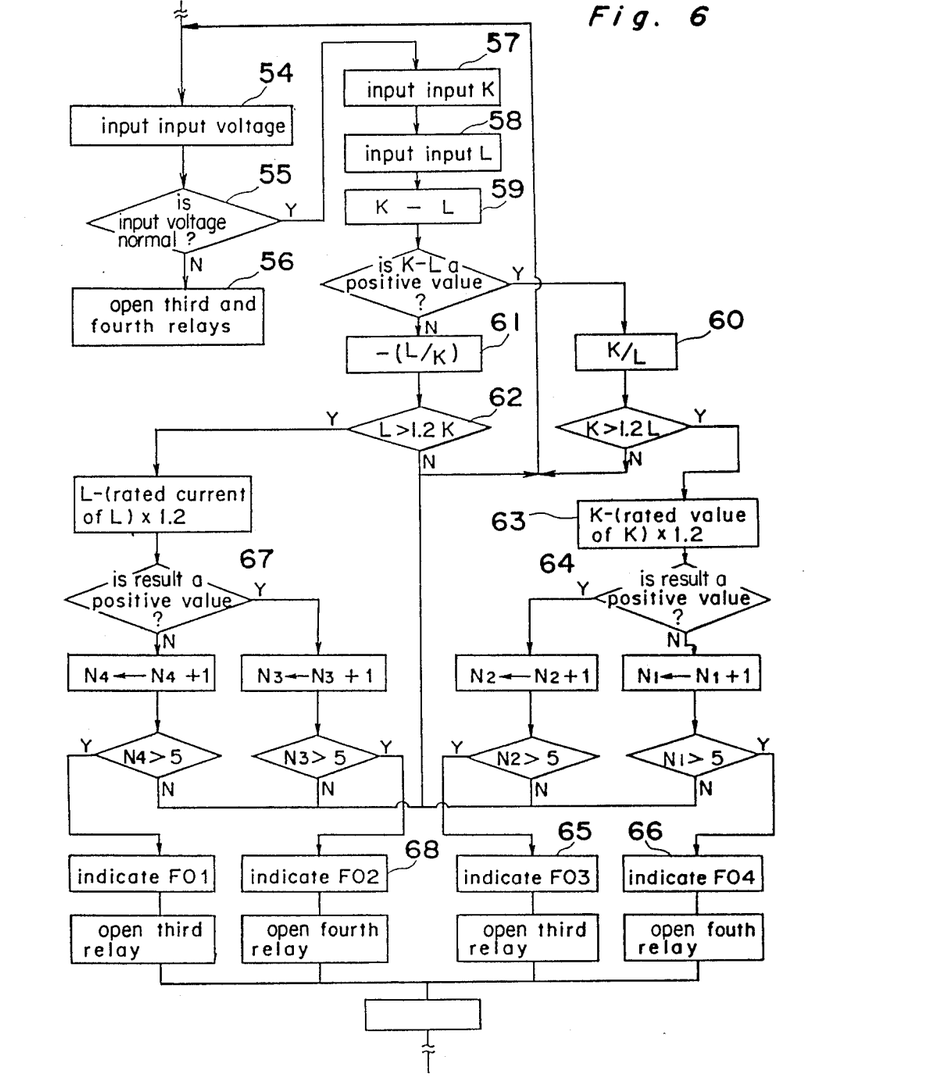
FIG. 6 is a flow chart on the failure examination of the major control portion of the apparatus of FIG. 4.

The control of the microcomputer circuit will be described with the use of the flowchart of FIG. 6.

Namely, the main body handles the input voltage from the input 45 at a given period during the operation (step 54). A determination is made as to whether the input voltage is within the range of a predetermined voltage (step 55). When the voltage is off by 15% or more with respect to the rated voltage in this embodiment, both the third intermittent relay 46 and the fourth intermittent relay 47 are turned off (opened) to prevent high frequency heating (step 56). In the other embodiment, it is possible that the operation is adapted not to be effected from the beginning if the voltage is abnormal with the voltage detection being provided even at the inoperative condition of the main body. The operation is continued when the voltage is within the normal range to temporarily store the voltage, caused in the coil 41 of the current transformer 22, in the memory (RAM) for inputting the DC voltage which has been rectified and smoothed. This is assumed to be K (step 57). Similarly, the DC output which has been detected by the coil 41' of the current transformer 22' is input. This is assumed to be L (step 58). L is subtracted from K in step 59. When the difference is positive, i.e. K is larger than L, the operation of K/L is effected (step 60). When it is negative, i.e. L is larger than K, the operation of - (L/K) is effected (step 61). In the embodiment, a determination is made as to whether the result is larger than 1.2. Namely, judgement is made as to whether (step 62) the difference between K and L is 20% or more. If the value is smaller than 1.2 (namely, it is judged that nothing is wrong with the two magnetrons, the value is within the errors to be caused through the dispersion and so on of the constant of the parts, being the normal function), the routine returns to the initial one so as to handle the input voltage again. When K is larger than L with the difference between K and L being abnormal by 20%, the value higher by 20% is felt (step 63) with respect to a value shown at the normal time of K predetermined from K to judge whether the value is positive or negative (step 64). When the value is positive, the current of K is abnormally large, i.e. is 1.2 times as much as the value of L and furthermore is larger than the rated current of the K. In the secondary current of the high-tension transformer 18, a number $N_2$ for judging that the high-tension capacitor 19 and so on has been short-circuited is measured. When this condition has continued five times or more, the third intermittent relay 46 is opened, that is the contact of the third intermittent relay 46 is opened to cut off only the abnormal current flowing into the high-tension transformer 18. FO3 showing the abnormality is displayed on the fluorescent display tube 23 (step 65).

When the value is negative, the value of L is abnormally lower as compared with the normal time. In the secondary circuit of the high-tension transformer 18', it is judged that the short-circuit of the high-tension diode 20', magnetron 9' and so on, or the portion of the secondary circuit has become opened. When the number $N_1$ has continued five times or more, the fourth intermittent relay 47 is opened to turn off the current flowing to the high-tension transformer 18'. The fluorescent display tube 23' displays FO4 (step 66). Once the third intermittent relay 46 or the fourth intermittent relay 47 has been opened in any case, the retaining program is kept in the relay until the power supply is cut off.

When the L is larger than the K, and the difference is 20% or more, the value high by 20% is reduced from the L with respect to a value shown at the normal time of the predetermined L so as to judge whether the value is positive or negative (step 67). If the value is positive, the current of the L is assumed to be abnormal. In the secondary circuit of the high-tension transformer 18', it is judged to be the short-circuit condition of the high-tension capacitor 19 and so on to measure the number $N_3$. When this condition has been continued five times or more, the fourth intermittent relay 47 is opened to turn off only the input to the high-tension transformer 18'. The fluorescent display tube 23 displays FO2 to notify the user of the abnormality (step 68). When the value has become negative, the K value is abnormally lower than the normal condition. It is judged that the high-tension diode 20 and the magnetron 9 in the secondary circuit of the high-tension transformer 18 have been short-circuited, or one portion of the secondary circuit has been opened. The number $N_4$ is counted. When this condition has continued five times or more, the third intermittent relay 46 is opened to turn off only the input to the high-tension transformer 18. The fluorescent display tube 23 is adapted to display the FO1. The measurement is effected every 0.1 second.

The above-description is given about two magnetrons. When more magnetrons are provided, the current detecting means as many as they are provided as described hereinabove. The difference between two respectively about the calculation of A-B, B-C, C... X-A is obtained about the detected signals A, B, C... X. It is judged whether the difference is respectively more than the difference established through the consideration of the current lag by the dispersion. When there is a difference therebetween, the circuit where the failure occurred is determined by the judgement of the size with respect to the value at the rated current predetermined as in the above-described embodiment so as to open the relay contact of only the circuit with the failure being caused therein.

As is clear from the foregoing description, according to the arrangement of the present invention, information obtained from the voltage detecting means, the current detecting means and the temperature detecting means is compared with the information predetermined by the major control portion in a heating apparatus having a digital control portion, the abnormality may be detected immediately, and the abnormal content may be confirmed at a glance by the display means. Also, even if the abnormality is caused during the heating operation, the heating operation may be automatically stopped so that extreme safety is ensured. As the abnormal place is definite, much time is not required to repair the abnormal location.

The other heating means continuously operates even if one of them fails in the heating apparatus having a plurality of heating means. Even if two high-frequency generating apparatuses (magnetrons) are provided, the cooking time becomes larger because the operation may be effected by the single magnetron. It may be used, thus resulting in considerable improvements.

The measured power-voltage is stored in the memory portion with the constant conditions by the use of the predetermined voltage detecting means to compare the content with the subsequent power voltage value, so that the error of the power voltage measuring circuit may be set off to ensure extremely high-precise measurement and detection, with the result that the considerable cost reduction may be provided as compared with the high-priced circuit component of extremely small dispersion.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A control apparatus for an electric appliance which is operated with a plurality of functions each of which is operated independently of each other, comprising:
    a load used for a plurality of functions;
    a relaying means for selectively connecting a power supply to said load;
    a monitor means connected to said load for monitoring an operating condition of said load;
    an input means for inputting a setting of an operation of said load to the electric appliance;
    a display means for displaying an operation of said input means and for displaying any abnormalities detected by said monitor means; and
    a major controlling means connected to said relaying means, monitor means, input means and display means, for performing a given controlling operation with respect to said monitor means and inputs set in the electric appliance, wherein, when an abnormality in said load has been detected by said monitor means, and when said power supply is disconnected from said load by said relaying means, and when said display of said detected abnormality is removed by a given operation of said input means, and when an operation mode which includes a portion of said detected abnormality is selected by said input means, said abnormality is displayed again on the display means and the operation of the operation mode is prohibited.

2. The control apparatus as defined in claim 1, wherein said plurality of loads comprise a microwave power generating apparatus.

3. The control apparatus as defined in claim 2, wherein said microwave power generating apparatus includes a magnetron.

4. The control apparatus as defined in claim 1, wherein said monitor means comprises a current transformer.

5. A control apparatus for an electric appliance comprising:
    an operation mode for simultaneously operating a plurality of loads;
    a monitor means for monitoring an operational state of each of said plurality of loads;
    an input means for setting up an operation of the electric appliance;
    a display means for displaying information being set up by said input means; and
    a main control means connected to said monitor means, input means and display means for controlling the operation of said plurality of loads in accordance with a selected operational mode;
    whereby, when any abnormalities in any one load of said plurality of loads are detected by said monitor means, the operation of the load having detected abnormalities is prohibited while the other loads of said plurality of loads are adapted to operate normally.

* * * * *